April 25, 1933.  A. V. GRIFFIN  1,905,381
EDUCATIONAL DEVICE
Filed July 29, 1932    2 Sheets-Sheet 1

Adella V. Griffin, INVENTOR
BY Victor J. Evans & Co.
ATTORNEY

April 25, 1933.   A. V. GRIFFIN   1,905,381
EDUCATIONAL DEVICE
Filed July 29, 1932   2 Sheets-Sheet 2
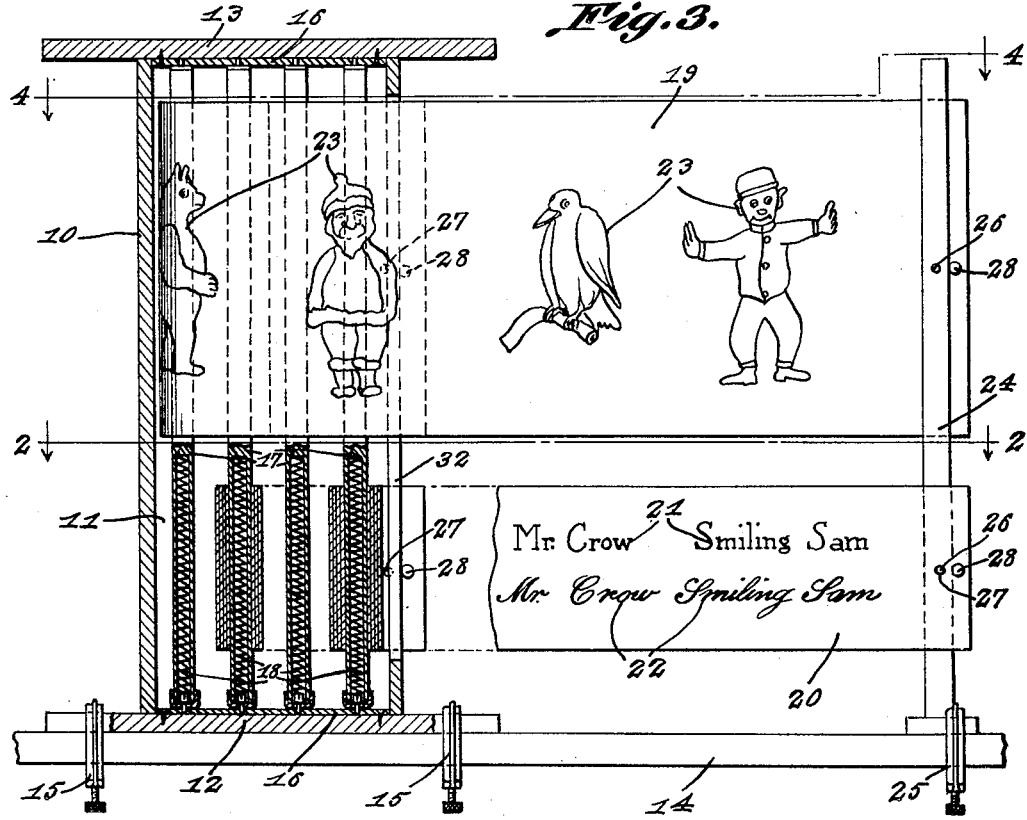
Fig. 3.
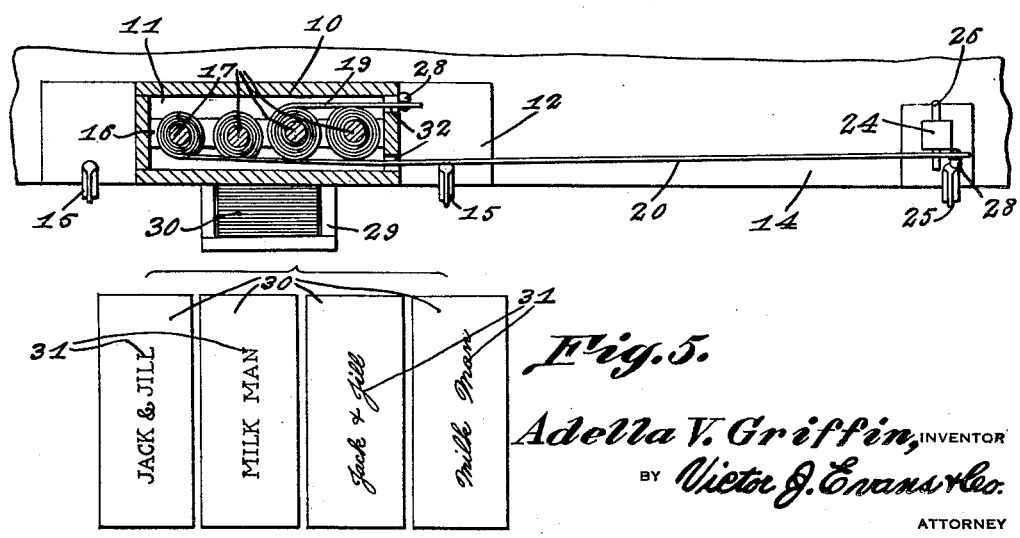
Fig. 4.
Fig. 5.
Adella V. Griffin, INVENTOR
BY Victor J. Evans & Co.
ATTORNEY Patented Apr. 25, 1933

1,905,381

UNITED STATES PATENT OFFICE

ADELLA VALLIANT GRIFFIN, OF SAN DIEGO, CALIFORNIA

EDUCATIONAL DEVICE

Application filed July 29, 1932. Serial No. 626,025.

The invention relates to an educational device and more especially to an equipment for use in a school classroom for teaching purposes.

The primary object of the invention is the provision of a device or equipment of this character, wherein the same may be readily mountable upon the chalk rail of a writing board or wall and includes a plurality of display strips or screens, these being normally concealed from view and bear indicia depicting certain events, characters or objects, so that when displayed selectively the pupils through identifying words, either printed or in script, may gain knowledge of the pictorial display or vice versa for mental reservation and thus arriving at educational achievement.

Another object of the invention is the provision of a device or equipment of this character wherein the display strips or screens are readily adjustable and these carry certain matter serviceable for educational purposes in learning to spell, read and speak, the matter being of pictorial kind and title designations, the said device or equipment being novel in form and is readily and easily adjusted for the use thereof.

A further object of the invention is the provision of a device or equipment of this character which is simple in construction, thoroughly reliable and efficient in its purposes, durable, readily and easily set up for use, entertaining and educational in its nature, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 3 is a vertical elevation partly in section.

Figure 4 is a sectional view on the line 4—4 of Figure 3 looking in the direction of the arrows.

Figure 5 is a plan view of separated cards bearing indicia for identification of the display of the device or equipment in the use thereof.

Similar reference characters indicate corresponding parts throughout the several views in the drawings.

Figure 1:
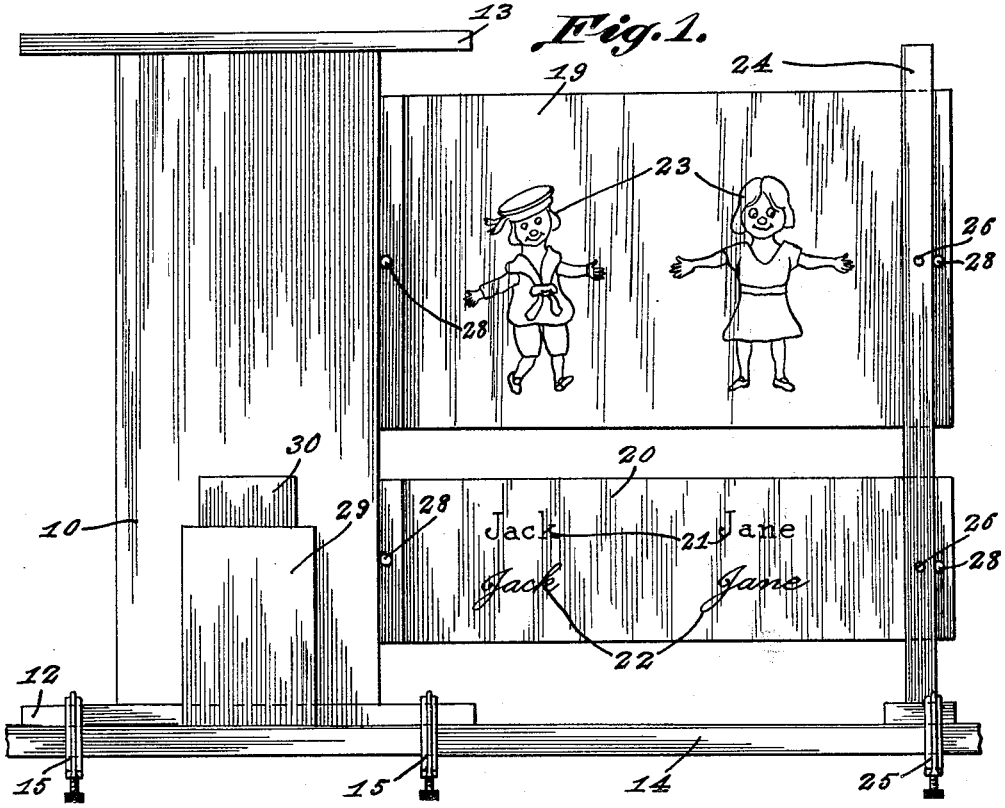
Figure 1 is an elevation of a device or equipment constructed in accordance with the invention, the same being shown mounted upon a chalk rail of a writing board or wall.
Figure 2:
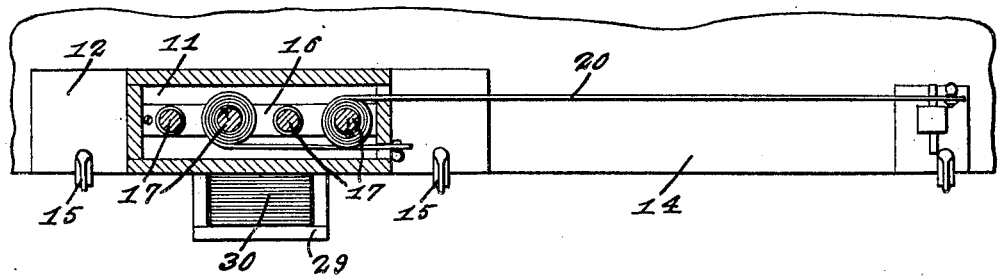
Figure 2 is a sectional view on the line 2—2 of Figure 3 looking in the direction of the arrows.

Referring to the drawings in detail, the device or equipment comprises a housing or casing 10 forming a roll chamber or compartment 11 interiorly thereof, the said housing or casing being walled on its four sides and is closed at opposite ends by end pieces 12 and 13 respectively, these being alike relative to each other so that in the mounting of the device or equipment it can be readily reversed and either end piece 12 superimposed upon a chalk rail 14 of a writing board or wall and held through the medium of removable clamps 15 as is clearly shown in Figures 1 to 4 inclusive of the drawings.

Removably journaled in suitable hangers 16 carried by the end pieces 12 and 13 to be confined within the housing or casing in its compartment or chamber 11 are spaced vertically disposed rollers 17, these being spring tensioned through the medium of coiled springs 18 simulating conventional window shade rollers.

These rollers 17 have fixed thereto and normally wound thereon under the tension of the springs 18 independent series of upper and lower display strips or screens 19 and 20 respectively, the latter bearing rows of printed words and script words 21 and 22 respectively, while the strip or screen 19 bears pictorial representations 23 which may be colored or otherwise ornamented for lending attraction and interest thereto. These representations depict certain happenings, events, objects or other things for educational purposes, while the words 21 and 22 are significant of titles corresponding to the representations 23, the strips or screens 19 and 20 being independently extendable and normally are retracted and wound upon the rollers 17 to be confined within the housing or casing 10.

Adapted to be supported by the rail 14 at the required distance from the housing or casing 10 is an anchoring post or upright 24, the same being detachably secured through a removable clamp 25 upon the rail 14 and with which is engageable the free ends of the strips or screens 19 and 20 when extended so as to hold the same in such extended condition for the exhibit of the display matter borne thereby so that pupils, particularly those attending classes of a school in the low grades, as for example, kindergarten, may acquire knowledge in an educational way by identifying the representations by words or those words by titles 21 and 22 respectively. In this fashion the child through exercises by the display of the representations 23 and the words 21 and 22 respectively may become trained in thought both in spelling, word identification and text or picture learning.

The post or upright carries anchoring pins 26, these being projected from opposite faces thereof, while the strips or screens 19 and 20 are provided with openings 27 for the reception of the pins 26 and in this matter the said strips or screens can be held extended or detachably fastened with the post or upright for the display of matter contained upon these strips or screens.

The free end of each strip or screen 19 and 20 carries a finger hold 28 for convenience in the pulling of the strip or screen when normally within the housing or casing 10 and wound upon its roller.

Formed on the housing or casing 10 is a pocket 29 in which is arranged a series of cards 30, these bearing printed and script words 31 and which cards are selective by a pupil for identifying by display thereon the representation 23 as may be exposed by the strip or screen 19 in the use of the device or equipment.

The device or equipment is usable in a schoolroom or classroom of an educational institution or may be servicable for home use in the teaching of an individual.

The construction of the housing or casing permits the reversal thereof in its mounting upon a support and in this both faces of the strip or screen 19 or 20 or both may bear indicia for exhibition for educational purposes.

The housing or casing 10 has provided in one side thereof clearance slots 32 for the strips or screens 19 and 20, these being movable therethrough in the manipulation thereof when the device is in use.

What is claimed is:

1. An educational device of the character described comprising a reversible housing, end pieces forming rests for the housing, spaced movable strips normally within the housing and bearing educational matter and adapted to be drawn laterally outward from said housing for display purposes one above the other, and a post removably supported spaced from the housing and detachably engaged by the strips on extension thereof from the housing.

2. An educational device of the character described comprising a reversible housing, end pieces forming rests for the housing, movable strips normally within the housing and adapted to be drawn outwardly laterally therefrom in spaced parallel relation to each other and bearing educational matter, means within the housing for the carriage of said strips, a post removably supported spaced from the housing and detachably engaged by the strips on extension thereof from the housing, and means on the post for detachably securing the strips thereto.

In testimony whereof I affix my signature.

ADELLA VALLIANT GRIFFIN.